United States Patent
Xie et al.

(10) Patent No.: US 11,057,603 B2
(45) Date of Patent: Jul. 6, 2021

(54) BINOCULAR CAMERA DEPTH CALIBRATION METHOD, DEVICE AND SYSTEM, AND STORAGE MEDIUM

(71) Applicant: Beijing Smarter Eye Technology Co. Ltd., Beijing (CN)

(72) Inventors: Qiwei Xie, Beijing (CN); Xinliang Wang, Beijing (CN); An Jiang, Beijing (CN); Yuan Hao, Beijing (CN); Jian Li, Beijing (CN)

(73) Assignee: Beijing Smarter Eye Technology Co. Ltd., Beijing (CN)

( * ) Notice: Subject to any disclaimer, the term of this patent is extended or adjusted under 35 U.S.C. 154(b) by 0 days.

(21) Appl. No.: 16/721,056

(22) Filed: Dec. 19, 2019

(65) Prior Publication Data
US 2021/0152803 A1  May 20, 2021

(30) Foreign Application Priority Data
Nov. 15, 2019  (CN) .......................... 201911118272.0

(51) Int. Cl.
| | |
|---|---|
| *H04N 13/128* | (2018.01) |
| *H04N 13/271* | (2018.01) |
| *H04N 13/246* | (2018.01) |
| *H04N 13/00* | (2018.01) |

(52) U.S. Cl.
CPC ......... *H04N 13/128* (2018.05); *H04N 13/246* (2018.05); *H04N 13/271* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 10,489,912 B1* | 11/2019 | Brailovskiy | .......... H04N 13/246 |
| 2013/0129192 A1* | 5/2013 | Wang | .......................... G06T 7/55 |
| | | | 382/154 |
| 2015/0334380 A1* | 11/2015 | Kim | ...................... H04N 13/324 |
| | | | 348/54 |
| 2016/0073092 A1* | 3/2016 | Lin | ........................... G06T 7/85 |
| | | | 348/49 |
| 2017/0127046 A1* | 5/2017 | Das | ....................... H04N 13/204 |
| 2017/0255803 A1* | 9/2017 | Yoscovich | .......... G06K 7/10366 |
| 2017/0322048 A1* | 11/2017 | Yoshida | ............... H04N 13/254 |

(Continued)

*Primary Examiner* — Kate H Luo
(74) *Attorney, Agent, or Firm* — Novick, Kim & Lee, PLLC; Allen Xue

(57) ABSTRACT

Provided is a binocular camera depth calibration method, a binocular camera depth calibration device, a binocular camera depth calibration system and a storage medium. The method includes: acquiring a plurality of groups of images of a 2D code calibration board at different positions so as to acquire disparity maps of the 2D code calibration board; acquiring a 2D code template image of a target region; matching the 2D code template image, so as to determine and store matching region information; determining a position of the 2D code template image in each disparity map in accordance with the matching region information, and calculating an average disparity value of the 2D code template image at the position; acquiring a plurality of groups of average disparity values, and calculating a final disparity value; and calibrating a depth of a binocular camera.

8 Claims, 2 Drawing Sheets

(56) References Cited

U.S. PATENT DOCUMENTS

| | | | |
|---|---|---|---|
| 2018/0103244 A1* | 4/2018 | Fang | G06T 7/85 |
| 2018/0108150 A1* | 4/2018 | Curtis | H04N 13/246 |
| 2018/0255283 A1* | 9/2018 | Li | H04N 13/271 |
| 2019/0012789 A1* | 1/2019 | Cutu | G06T 7/11 |
| 2019/0158813 A1* | 5/2019 | Rowell | H04N 13/189 |
| 2019/0180133 A1* | 6/2019 | Shannon | G06T 7/11 |

\* cited by examiner

BINOCULAR CAMERA DEPTH CALIBRATION METHOD, DEVICE AND SYSTEM, AND STORAGE MEDIUM

TECHNICAL FIELD

The present disclosure relates to the field of digital image processing technology, in particular to a binocular camera depth calibration method, a binocular camera depth calibration device, a binocular camera depth calibration system, and a storage medium.

BACKGROUND

Along with the development of the sensor technology and the machine vision technology, binocular cameras have been widely applied to robots and intelligent vehicles. A depth of the binocular camera needs to be calibrated so as to enable the binocular camera to collect an image accurately. Currently, during the calibration of the depth of the binocular camera, internal and external parameters of each of a left-eye camera and a right-eye camera need to be acquired at first, and then a left-eye image and a right-eye image may be calibrated through stereo calibration, so as to finally determine a relative position relationship between the left-eye camera and the right-eye camera. However, during the calibration, the two cameras need to be positioned to a same point, i.e., each point in one of the left-eye image and the right-eye image needs to match a corresponding point in the other one of the left-eye image and the right-eye image, so a binocular calibration operation needs to be performed. When a corresponding point in a two-dimensional (2D) image space is searched in accordance with a feature of a point on one image, the entire matching procedure is remarkably time-consuming. Hence, when the depth of the binocular camera is calibrated in a bidirectional fixed-point matching manner, the entire calibration procedure is slow, and a calibration result is less accurate.

SUMMARY

An object of the present disclosure is to provide a binocular camera depth calibration method, a binocular camera depth calibration device, a binocular camera depth calibration system, and a storage medium, so as to at least accelerate the procedure of calibrating the depth of the binocular camera and provide an accurate calibration result.

In one aspect, the present disclosure provides in some embodiments a binocular camera depth calibration method, including: acquiring a plurality of groups of images of a 2D code calibration board at different positions, and processing the plurality of groups of images so as to acquire disparity maps of the 2D code calibration board; extracting an image calibration board region corresponding to each monocular camera from each disparity map, and acquiring a 2D code template image of a target region; matching the 2D code template image with all images corresponding to the monocular camera at the image calibration board region, so as to determine and store matching region information; determining a position of the 2D code template image in each disparity map in accordance with the matching region information, and calculating an average disparity value of the 2D code template image at the position; acquiring a plurality of groups of average disparity values through extracting a plurality of image calibration board regions, and calculating a final disparity value in accordance with the plurality of groups of average disparity values; and calibrating a depth of a binocular camera in accordance with the final disparity value.

In a possible embodiment of the present disclosure, the acquiring the plurality of groups of images of the 2D code calibration board at different positions and processing the plurality of groups of images so as to acquire the disparity maps of the 2D code calibration board includes: acquiring a distance between a position of the 2D code calibration board and the binocular camera; and collecting 10 groups of images every other meter when the distance is 3 m to 12 m, or collecting 10 groups of images every other two meters when the distance is 10 m to 30 m, or collecting 10 groups of images every other five meters when the distance is 5 m to 50 m.

In a possible embodiment of the present disclosure, the extracting the image calibration board region corresponding to each monocular camera from each disparity map and extracting a 2D code template image of the target region includes: selecting a 2D code calibration board region in each image corresponding to the monocular camera so as to acquire position information about a selected rectangular region; and acquiring the 2D code template image in accordance with the position information about the rectangular region. The position information about the rectangular region is outputted in a matrix form, and stored as a configuration file of a system.

In a possible embodiment of the present disclosure, the acquiring the disparity maps of the 2D code calibration board includes exhibiting disparity information in an image matrix form with different colors representing different disparity values, and visually displaying digitalized disparity information in the form of image, so as to generate the disparity maps.

In a possible embodiment of the present disclosure, the calibrating the depth of the binocular camera in accordance with the final disparity value includes fitting a formula between the distance and the disparity value using a least square method in accordance with information about the distance and information about the disparity value for a same group of images, and calibrating the depth of the binocular camera in accordance with the fitted formula.

In another aspect, the present disclosure provides in some embodiments a binocular camera depth calibration device, including: a disparity map acquisition unit configured to acquire a plurality of groups of images of a 2D code calibration board at different positions, and process the plurality of groups of images so as to acquire disparity maps of the 2D code calibration board; a template image acquisition unit configured to extract an image calibration board region corresponding to each monocular camera from each disparity map, and acquire a 2D code template image of a target region; an image matching unit configured to match the 2D code template image with all images corresponding to the monocular camera at the image calibration board region, so as to determine and store matching region information; an average disparity value acquisition unit configured to determine a position of the 2D code template image in each disparity map in accordance with the matching region information, and calculate an average disparity value of the 2D code template image at the position; a final disparity value acquisition unit configured to acquire a plurality of groups of average disparity values through extracting a plurality of image calibration board regions, and calculate a final disparity value in accordance with the plurality of groups of average disparity values; and a calibration unit configured to calibrate a depth of a binocular camera in accordance with the final disparity value.

In a possible embodiment of the present disclosure, the disparity map acquisition unit is further configured to: acquire a distance between a position of the 2D code calibration board and the binocular camera; and collect 10 groups of images every other meter when the distance is 3 m to 12 m, or collect 10 groups of images every other two meters when the distance is 10 m to 30 m, or collect 10 groups of images every other five meters when the distance is 5 m to 50 m.

In a possible embodiment of the present disclosure, the template image acquisition unit is further configured to: select a 2D code calibration board region in each image corresponding to the monocular camera so as to acquire position information about a selected rectangular region; and acquire the 2D code template image in accordance with the position information about the rectangular region. The position information about the rectangular region is outputted in a matrix form, and stored as a configuration file of a system.

In yet another aspect, the present disclosure provides in some embodiments a binocular camera depth calibration system, including a processor and a memory. The memory is configured to store therein one or more program instructions. The processor is configured to execute the one or more program instructions, so as to implement the above-mentioned binocular camera depth calibration method.

In still yet another aspect, the present disclosure provides in some embodiments a computer-readable storage medium storing therein one or more program instructions. The one or more program instructions are executed by a binocular camera depth calibration system so as to implement the above-mentioned binocular camera depth calibration method.

According to the binocular camera depth calibration method, the binocular camera depth calibration device, the binocular camera depth calibration system and the storage medium in the embodiments of the present disclosure, binocular disparity values of the calibration board may be detected at different positions so as to acquire the disparity maps of the calibration board. Next, the desired target region may be selected from each disparity map, and the average disparity value may be acquired for the monocular camera at different positions in the target region. Then, the formula between the distance and the disparity value may be fitted using a least square method in accordance with the information about the distance and the information about the disparity value for the same group of images, and the depth of the binocular camera may be calibrated in accordance with the fitted formula. As a result, through matching the position of the 2D code calibration board, it is able to calibrate the depth of the binocular camera rapidly and accurately in accordance with the disparity information.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

The structure, scale and size shown in the drawings are merely provided to facilitate the understanding of the contents disclosed in the description but shall not be construed as limiting the scope of the present disclosure, so they has not substantial meanings technically. Any modification on the structure, any change to the scale or any adjustment on the size shall also fall within the scope of the present disclosure in the case of not influencing the effects and the purposes of the present disclosure.

REFERENCE SIGN LIST

Figure 1:
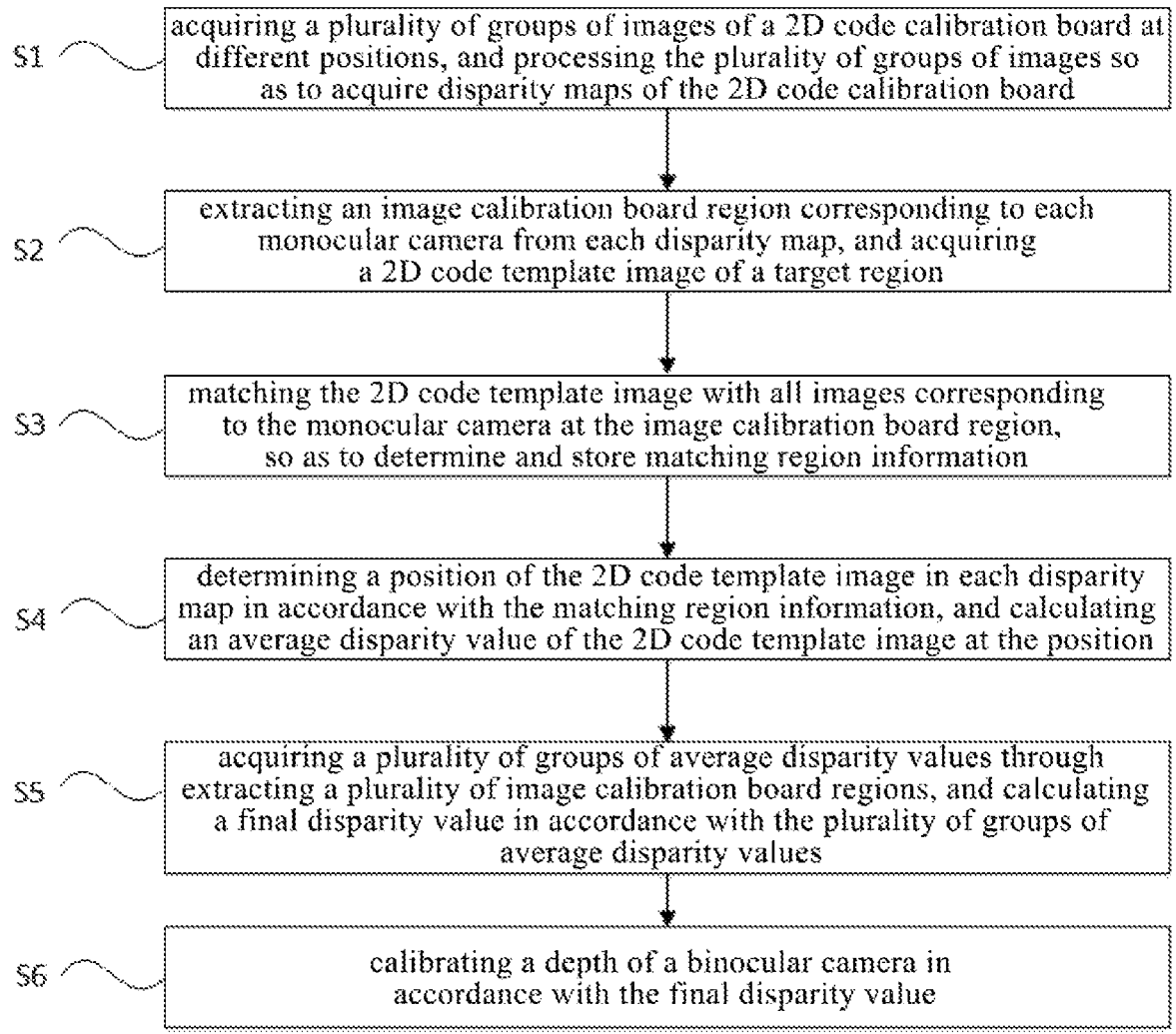
FIG. 1 is a flow chart of a binocular camera depth calibration method according to one embodiment of the present disclosure.

100 disparity map acquisition unit
200 template image acquisition unit
300 image matching unit
400 average disparity value acquisition unit
500 final disparity value acquisition unit
600 calibration unit

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments a binocular camera depth calibration method, so as to rapidly and accurately calibrate a depth of a binocular camera through matching a 2D code calibration board in accordance with disparity information. As shown in FIG. 1, the binocular camera depth calibration method may include the following steps.

S1: acquiring a plurality of groups of images of a 2D code calibration board at different positions, and processing the plurality of groups of images so as to acquire disparity maps of the 2D code calibration board. To be specific, the images of the 2D code calibration board may be collected through a left-eye camera and a right-eye camera respectively, so as to acquire the images of the 2D code calibration board using a binocular camera. Next, the position of the 2D code calibration board may be changed, so as to acquire the plurality of groups of images of the 2D code calibration board at different positions. Then, the plurality of groups of images may be subjected to noise reduction and integration, so as to acquire the disparity maps of the 2D code calibration board. Each disparity map may be used to reflect a relationship between the position of the 2D code calibration board and the acquired image.

During the implementation, when a distance between the 2D code calibration board and the binocular camera is 10 m, in order to ensure the image collection accuracy, 10 groups of images may be collected every other meter. In other words, when the distance between the 2D code calibration board and the binocular camera is 10 m, totally 100 groups of images may be collected at different positions, and a set of the images may be taken as a basis for the formation of the disparity maps of the 2D code calibration board. The plurality of groups of images may be processed and integrated, and the images acquired at different distances may be analyzed, so as to acquire the disparity maps.

S2: extracting an image calibration board region corresponding to each monocular camera from each disparity map, and acquiring a 2D code template image of a target region. At this time, the monocular camera may be the left-eye camera or the right-eye camera. To be specific, a 2D code calibration board region in an image corresponding to the monocular camera may be selected so as to acquire position information about a selected rectangular region. Then, the 2D code template image may be acquired in accordance with the position information about the rectangular region. The position information about the rectangular region may be outputted in a matrix form, and stored as a configuration file of a system.

For example, when a 2D code template image at a distance of 5 m for the left-eye camera, an image of the 2D code calibration board acquired by the left-eye camera at a distance of 5 m may be selected, and the 2D code template image corresponding to the position information may be acquired at the selected region. Then, the position information about the selected region may be outputted in a matrix form, and stored as a configuration file of a Windows system.

In order to improve the resolution and facilitate the identification, disparity information may also be exhibited in an image matrix form with different colors representing different disparity values, and digitalized disparity information may be visually displayed in an image form, so as to generate the disparity maps. In actual use, a selection box may be set in blue or red, and when a plurality of regions needs to be selected, the selection boxes in different colors may be provided at different positions, so as to facilitate the identification and prevent the regions from being confused. More importantly, different colors may be used to represent different disparity values. For example, light blue may be used to represent a disparity value of 0 to 10 μm, dark blue may be used to represent a disparity value of 10 to 20 μm, and red may be used to represent a disparity value of 20 to 30 μm. Through outputting the digitalized disparity value by converting it into a corresponding color, it is able to generate the disparity maps in a simple and intuitive manner, thereby to facilitate the identification and improve the readability.

S3: matching the 2D code template image with all images corresponding to the monocular camera at the image calibration board region, so as to determine and store matching region information. During the collection, the plurality of groups of images may be collected by each of the left-eye camera and the right-eye camera. When the matching region information is required, it is necessary to match the 2D code template image with all the images at a designated region, so as to find a region at a high matching level, thereby to ensure the accuracy of the matching region information.

S4: determining a position of the 2D code template image in each disparity map in accordance with the matching region information, and calculating an average disparity value of the 2D code template image at the position. The acquired region at a high matching level may be just a target matching region to be searched. There may exist a plurality of groups of disparity values at this region, and these disparity values may be formed by a plurality of groups of images acquired by the binocular camera at the region. In this step, the average disparity value may be acquired in accordance with the disparity values at all positions in the matching region.

S5: acquiring a plurality of groups of average disparity values through extracting a plurality of image calibration board regions, and calculating a final disparity value in accordance with the plurality of groups of average disparity values. When there is a plurality of target regions, a plurality of average disparity values at different regions may be acquired through this step, and then these average disparity values may be averaged to acquire the final disparity value, i.e., an actual disparity value of the image calibration board.

S6: calibrating a depth of the binocular camera in accordance with the final disparity value. To be specific, a formula between the distance and the disparity value may be fitted using a least square method in accordance with information about the distance and information about the disparity value for the same group of images, and then the depth of the binocular camera may be calibrated in accordance with the formula.

Further, in order to improve the sampling accuracy, it is necessary to adjust the quantity of groups of images in accordance with the distances between the 2D code calibration board and the binocular camera as follows.

At first, a distance between the 2D code calibration board and the binocular camera may be acquired, and a distance range to which the distance belongs may be determined. When the distance is 3 m to 12 m, 10 groups of images may be collected every other meter; when the distance is 10 m to 30 m, 10 groups of images may be collected every other two meters; and when the distance is 5 m to 50 m, 10 groups of images may be collected every other five meters.

The implementation of the method in the embodiments of the present disclosure will be described hereinafter briefly by taking the left-eye camera as a to-be-calibrated camera.

Step 1: collecting the images of the 2D code calibration board through the binocular camera, so as to acquire the disparity maps of the 2D code calibration board.

Step 2: selecting a target region, and extracting a template image of the 2D code calibration board at the target region.

To be specific, the extracting the template image of the 2D code calibration board at the target region may include: Step 1.1 of selecting the 2D code calibration board in each left-eye image; Step 1.2 of recording and storing position information about a selected region; and Step 1.3 of extracting the template image in accordance with the position information about the selected region.

Step 3: matching the template image with all the left-eye images, and recording and storing position information about a matching region of each left-eye image.

Step 4: positioning the image of the 2D code calibration board in each disparity map in accordance with the position information about the matching region.

Step 5: calculating an average disparity value of the 2D code calibration board in each disparity map.

Step 6: calculating an average disparity value of the 2D code calibration board in a plurality of disparity maps acquired at a same distance.

Step 7: calculating the disparity values corresponding to different distances.

Step 8: fitting a depth calibration formula in accordance with the disparity values corresponding to different distances.

According to the binocular camera depth calibration method in the embodiments of the present disclosure, binocular disparity values of the calibration board may be detected at different positions so as to acquire the disparity maps of the calibration board. Next, the desired target region may be selected from each disparity map, and the average disparity value may be acquired for the monocular camera at different positions in the target region. Then, the formula between the distance and the disparity value may be fitted using the least square method in accordance with the information about the distance and the information about the disparity value for the same group of images, and the depth of the binocular camera may be calibrated in accordance with the fitted formula. As a result, through matching the position of the 2D code calibration board, it is able to calibrate the depth of the binocular camera rapidly and accurately in accordance with the disparity information.

Figure 2:
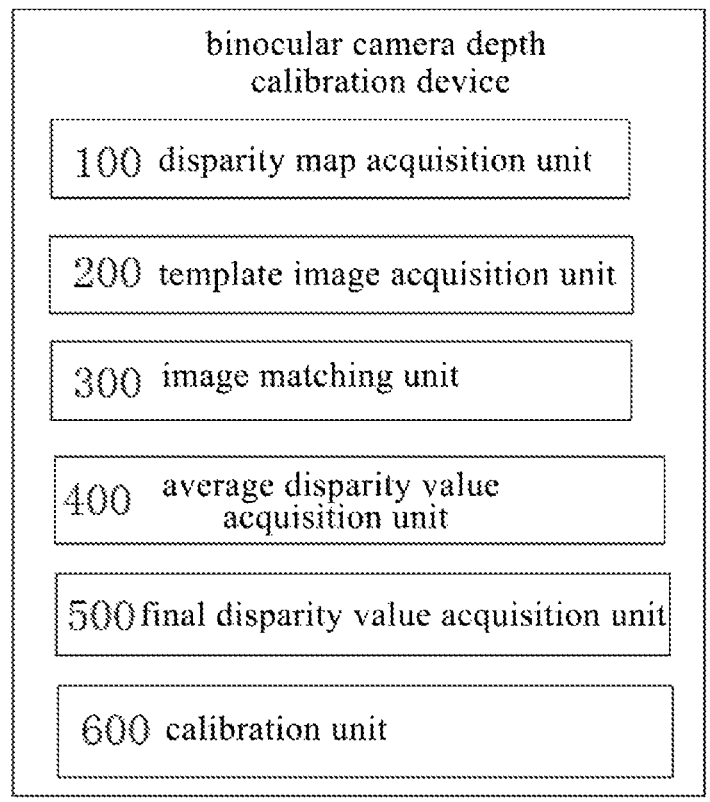
FIG. 2 is a block diagram of a binocular camera depth calibration device according to one embodiment of the present disclosure.

The present disclosure further provides in some embodiments a binocular camera depth calibration device which, as shown in FIG. 2, includes a disparity map acquisition unit 100, a template image acquisition unit 200, an image matching unit 300, an average disparity value acquisition unit 400, a final disparity value acquisition unit 500, and a calibration unit 600.

The disparity map acquisition unit 100 is configured to acquire a plurality of groups of images of a 2D code calibration board at different positions, and process the plurality of groups of images so as to acquire disparity maps of the 2D code calibration board. To be specific, the images of the 2D code calibration board may be collected through a left-eye camera and a right-eye camera respectively, so as to acquire the images of the 2D code calibration board using a binocular camera. Next, the position of the 2D code calibration board may be changed, so as to acquire the plurality of groups of images of the 2D code calibration board at different positions. Then, the plurality of groups of images may be subjected to noise reduction and integration, so as to acquire the disparity maps of the 2D code calibration board. Each disparity map may be used to reflect a relationship between the position of the 2D code calibration board and the acquired image.

During the implementation, when a distance between the 2D code calibration board and the binocular camera is 10 m, in order to ensure the image collection accuracy, 10 groups of images may be collected every other meter. In other words, when the distance between the 2D code calibration board and the binocular camera is 10 m, totally 100 groups of images may be collected at different positions, and a set of the images may be taken as a basis for the formation of the disparity maps of the 2D code calibration board. The plurality of groups of images may be processed and integrated, and the images acquired at different distances may be analyzed, so as to acquire the disparity maps.

The template image acquisition unit 200 is configured to extract an image calibration board region corresponding to each monocular camera from each disparity map, and acquire a 2D code template image of a target region. At this time, the monocular camera may be the left-eye camera or the right-eye camera. To be specific, a 2D code calibration board region in an image corresponding to the monocular camera may be selected so as to acquire position information about a selected rectangular region. Then, the 2D code template image may be acquired in accordance with the position information about the rectangular region. The position information about the rectangular region may be outputted in a matrix form, and stored as a configuration file of a system.

For example, when a 2D code template image at a distance of 5 m for the left-eye camera, an image of the 2D code calibration board acquired by the left-eye camera at a distance of 5 m may be selected, and the 2D code template image corresponding to the position information may be acquired at the selected region. Then, the position information about the selected region may be outputted in a matrix form, and stored as a configuration file of a Windows system.

In order to improve the resolution and facilitate the identification, disparity information may also be exhibited in an image matrix form with different colors representing different disparity values, and digitalized disparity information may be visually displayed in an image form, so as to generate the disparity maps. In actual use, a selection box may be set in blue or red, and when a plurality of regions needs to be selected, the selection boxes in different colors may be provided at different positions, so as to facilitate the identification and prevent the regions from being confused. More importantly, different colors may be used to represent different disparity values. For example, light blue may be used to represent a disparity value of 0 to 10 μm, dark blue may be used to represent a disparity value of 10 to 20 μm, and red may be used to represent a disparity value of 20 to 30 μm. Through outputting the digitalized disparity value by converting it into a corresponding color, it is able to generate the disparity maps in a simple and intuitive manner, thereby to facilitate the identification and improve the readability.

The image matching unit 300 is configured to match the 2D code template image with all images corresponding to the monocular camera at the image calibration board region, so as to determine and store matching region information. During the collection, the plurality of groups of images may be collected by each of the left-eye camera and the right-eye camera. When the matching region information is required, it is necessary to match the 2D code template image with all the images at a designated region, so as to find a region at a high matching level, thereby to ensure the accuracy of the matching region information.

The average disparity value acquisition unit 400 is configured to determine a position of the 2D code template image in each disparity map in accordance with the matching region information, and calculate an average disparity value of the 2D code template image at the position. The acquired region at a high matching level may be just a target matching region to be searched. There may exist a plurality of groups of disparity values at this region, and these disparity values may be formed by a plurality of groups of images acquired by the binocular camera at the region. In this step, the average disparity value may be acquired in accordance with the disparity values at all positions in the matching region.

The final disparity value acquisition unit 500 is configured to acquire a plurality of groups of average disparity values through extracting a plurality of image calibration board regions, and calculate a final disparity value in accordance with the plurality of groups of average disparity values. When there is a plurality of target regions, a plurality of average disparity values at different regions may be acquired through this step, and then these average disparity values may be averaged to acquire the final disparity value, i.e., an actual disparity value of the image calibration board.

The calibration unit 600 is configured to calibrate a depth of a binocular camera in accordance with the final disparity value. To be specific, a formula between the distance and the disparity value may be fitted using a least square method in accordance with information about the distance and information about the disparity value for the same group of images, and then the depth of the binocular camera may be calibrated in accordance with the formula.

The disparity map acquisition unit is further configured to: acquire a distance between a position of the 2D code calibration board and the binocular camera; and collect 10 groups of images every other meter when the distance is 3 m to 12 m, or collect 10 groups of images every other two meters when the distance is 10 m to 30 m, or collect 10 groups of images every other five meters when the distance is 5 m to 50 m.

The template image acquisition unit is further configured to: select a 2D code calibration board region in each image corresponding to the monocular camera so as to acquire position information about a selected rectangular region; and acquire the 2D code template image in accordance with the position information about the rectangular region. The position information about the rectangular region may be outputted in a matrix form, and stored as a configuration file of a system.

According to the binocular camera depth calibration device in the embodiments of the present disclosure, binocular disparity values of the calibration board may be detected at different positions so as to acquire the disparity maps of the calibration board. Next, the desired target region may be selected from each disparity map, and the average disparity value may be acquired for the monocular camera at different positions in the target region. Then, the formula between the distance and the disparity value may be fitted using the least square method in accordance with the information about the distance and the information about the disparity value for the same group of images, and the depth of the binocular camera may be calibrated in accordance with the fitted formula. As a result, through matching the position of the 2D code calibration board, it is able to calibrate the depth of the binocular camera rapidly and accurately in accordance with the disparity information.

Figure 3:
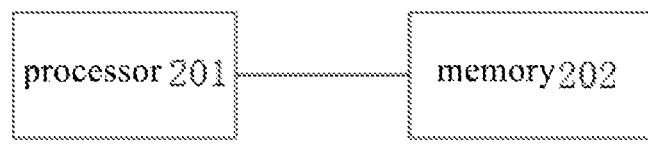
FIG. 3 is a block diagram of a binocular camera depth calibration system according to one embodiment of the present disclosure.

The present disclosure further provides in some embodiments a binocular camera depth calibration system which, as shown in FIG. 3, includes a processor 201 and a memory 202. The memory is configured to store therein one or more program instructions. The processor is configured to execute the one or more program instructions, so as to implement the above-mentioned binocular camera depth calibration method.

Correspondingly, the present disclosure further provides in some embodiments a computer-readable storage medium storing therein one or more program instructions. The one or more program instructions may be executed by a binocular camera depth calibration system so as to implement the above-mentioned binocular camera depth calibration method.

In the embodiments of the present disclosure, the processor may be an integrated circuit (IC) having a signal processing capability. The processor may be a general-purpose processor, a Digital Signal Processor (DSP), an Application Specific Integrated Circuit (ASIC), a Field Programmable Gate Array (FPGA) or any other programmable logic element, discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as a Random Access Memory (RAM), a flash memory, a Read-Only Memory (ROM), a Programmable ROM (PROM), an Electrically Erasable PROM (EEPROM), or a register. The processor may read information stored in the storage medium so as to implement the steps of the method in conjunction with the hardware.

The storage medium may be a memory, e.g., a volatile, a nonvolatile memory, or both.

The nonvolatile memory may be an ROM, a PROM, an EPROM, an EEPROM or a flash disk.

The volatile memory may be an RAM which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM).

The storage medium in the embodiments of the present disclosure intends to include, but not limited to, the above-mentioned and any other appropriate memories.

It should be appreciated that, in one or more examples, the functions mentioned in the embodiments of the present disclosure may be achieved through hardware in conjunction with software. For the implementation, the corresponding functions may be stored in a computer-readable medium, or may be transmitted as one or more instructions on the computer-readable medium. The computer-readable medium may include a computer-readable storage medium and a communication medium. The communication medium may include any medium capable of transmitting a computer program from one place to another place. The storage medium may be any available medium capable of being accessed by a general-purpose or special-purpose computer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A binocular camera depth calibration method, comprising:

acquiring a plurality of groups of images of a two-dimensional (2D) code calibration board at a plurality of positions, and processing the plurality of groups of images so as to acquire a plurality of disparity maps of the 2D code calibration board, which comprises:
acquiring a distance between a position of the 2D code calibration board and the
binocular camera; and
collecting 10 groups of images every other meter when the distance is 3 m to 12 m, or
collecting 10 groups of images every other two meters when the distance is 10 m to 30 m,
or collecting 10 groups of images every other five meters when the distance is 5 m to 50 m;
extracting an image calibration board region corresponding to a monocular camera from each of the plurality of disparity maps and acquiring a 2D code template image of a target region;
matching the 2D code template image with all images corresponding to the monocular camera at the image calibration board region so as to determine and store matching region information;
determining a position of the 2D code template image in each of the plurality of disparity maps in accordance with the matching region information, and calculating an average disparity value of the 2D code template image at the position;

acquiring a plurality of groups of average disparity values through extracting a plurality of image calibration board regions and calculating a final disparity value in accordance with the plurality of groups of average disparity values; and calibrating a depth of a binocular camera in accordance with the final disparity value.

2. The binocular camera depth calibration method according to claim 1, wherein the extracting step comprises:

selecting a 2D code calibration board region in each image corresponding to the monocular camera so as to acquire position information about a selected rectangular region; and acquiring the 2D code template image in accordance with the position information about the rectangular region, wherein the position information about the rectangular region is outputted in a matrix form.

3. The binocular camera depth calibration method according to claim 2, wherein the acquiring the plurality of disparity maps of the 2D code calibration board comprises exhibiting disparity information in an image matrix form with different colors representing different disparity values, and displaying digitalized disparity information in the form of image generate the plurality of disparity maps.

4. The binocular camera depth calibration method according to claim 1, wherein the calibrating step comprises fitting a formula between the distance and the disparity value using a least square method in accordance with information about the distance and information about the disparity value for a same group of images, and calibrating the depth of the binocular camera in accordance with the fitted formula.

5. A binocular camera depth calibration system, comprising a processor and a memory, wherein the memory is configured to store therein one or more program instructions, and the processor is configured to execute the one or more program instructions so as to implement the binocular camera depth calibration method according to claim 1.

6. A non-transitory computer-readable storage medium storing therein one or more program instructions, wherein the one or more program instructions is executed by a binocular camera depth calibration system so as to implement the binocular camera depth calibration method according to claim 1.

7. A binocular camera depth calibration device, comprising:

a disparity map acquisition unit configured to acquire a plurality of groups of images of a 2D code calibration board at a plurality of positions, and process the plurality of groups of images so as to acquire a plurality of disparity maps of the 2D code calibration board;

a template image acquisition unit configured to extract an image calibration board region corresponding to each monocular camera from each of the plurality of disparity maps and acquire a 2D code template image of a target region;

an image matching unit configured to match the 2D code template image with all images corresponding to the monocular camera at the image calibration board region so as to determine and store matching region information;

an average disparity value acquisition unit configured to determine a position of the 2D code template image in each disparity map in accordance with the matching region information, and calculate an average disparity value of the 2D code template image at the position;

a final disparity value acquisition unit configured to acquire a plurality of groups of average disparity values through extracting a plurality of image calibration board regions, and calculate a final disparity value in accordance with the plurality of groups of average disparity values; and a calibration unit configured to calibrate a depth of a binocular camera in accordance with the final disparity value, wherein the disparity map acquisition unit is further configured to:

acquire a distance between a position of the 2D code calibration board and the binocular camera; and collect 10 groups of images every other meter when the distance is 3 m to 12 m, or collect 10 groups of images every other two meters when the distance is 10 m to 30 m, or collect 10 groups of images every other five meters when the distance is 5 m to 50 m.

8. The binocular camera depth calibration device according to claim 7, wherein the template image acquisition unit is further configured to:

select a 2D code calibration board region in each image corresponding to the monocular camera so as to acquire position information about a selected rectangular region; and acquire the 2D code template image in accordance with the position information about the rectangular region, wherein the position information about the rectangular region is outputted in a matrix form.

* * * * *